(12) United States Patent
Shinagawa

(10) Patent No.: US 8,988,723 B2
(45) Date of Patent: Mar. 24, 2015

(54) PRINTING APPARATUS FOR EXECUTING PRINT PROCESSING BASED UPON PRINT DATA

(71) Applicant: Canon Kabushiki Kaisha, Tokyo (JP)

(72) Inventor: Kazutaka Shinagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 13/660,701

(22) Filed: Oct. 25, 2012

(65) Prior Publication Data

US 2013/0135679 A1     May 30, 2013

(30) Foreign Application Priority Data

Nov. 30, 2011    (JP) .................................. 2011-262656

(51) Int. Cl.
     *G06K 15/02*      (2006.01)
(52) U.S. Cl.
     CPC ........ *G06K 15/1856* (2013.01); *G06K 15/1886* (2013.01)
     USPC .......................................... 358/1.16; 358/403
(58) Field of Classification Search
     CPC .............. G06K 15/02; G06K 15/1867; G06K 15/1886; H04N 1/00148; H04N 1/00151; H04N 1/00185; H04N 1/00188

USPC .............. 358/1.1, 1.13, 1.16, 1.17, 400, 401, 358/403, 444
     See application file for complete search history.

(56) References Cited

U.S. PATENT DOCUMENTS

| | | | |
|---|---|---|---|
| 7,612,919 B2 * | 11/2009 | Takahashi | ...................... 358/400 |
| 2005/0238402 A1 | 10/2005 | Yamada et al. | |
| 2012/0092711 A1 * | 4/2012 | Hosoda | ........................ 358/1.15 |

FOREIGN PATENT DOCUMENTS

| | | | |
|---|---|---|---|
| JP | 2001-63158 A | | 3/2001 |
| JP | 2009-122928 A | | 6/2009 |
| JP | 2009122928 A | * | 6/2009 |

* cited by examiner

*Primary Examiner* — Thomas D Lee
(74) *Attorney, Agent, or Firm* — Fitzpatrick, Cella, Harper & Scinto

(57) ABSTRACT

Disclosed are a printing apparatus for executing print processing based upon print data and a method of controlling this apparatus. The print data is saved in a first memory area, the print data, which has been saved in the first memory area, is rendered into image data, the rendered image data is stored in a second memory area, and printing is performed using the image data. A determination is made as to whether the image data, which has been stored in the second memory area, is to be saved for the purpose of reprint process.

5 Claims, 8 Drawing Sheets

F I G. 1
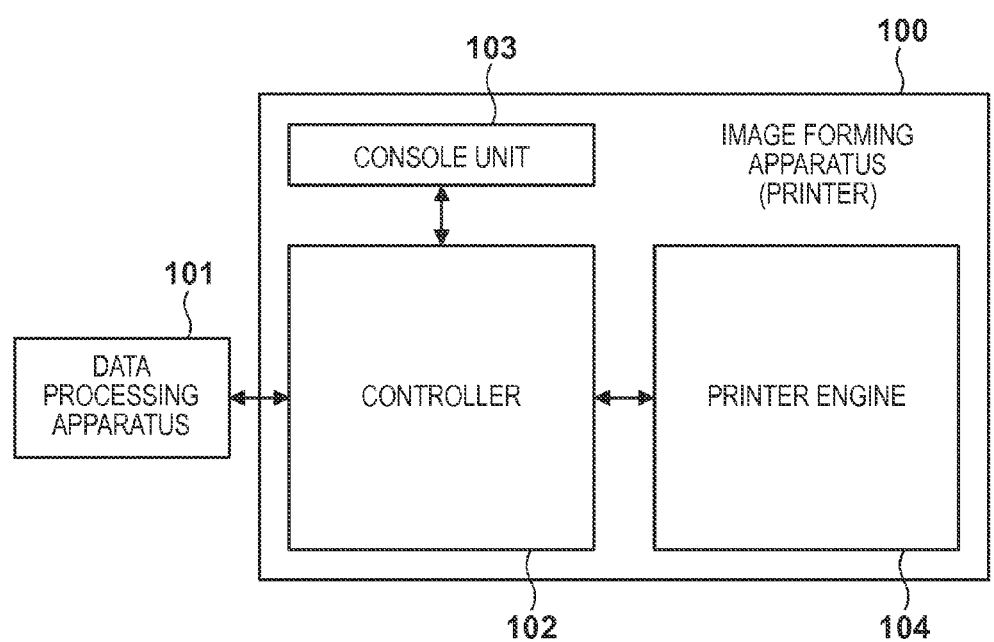

FIG. 4

| JOB ID | JOB OWNER | JOB NAME | JOB SIZE | JOB GENERATION DATE AND TIME | LATEST PRINT DATE AND TIME | STORED IMAGE |
|---|---|---|---|---|---|---|
| JID001 | UID004 | RESPONSIBILITY ASSIGNMENT TABLE | 300KB | 2000/01/23 09:33 | 2000/01/24 14:15 | DOES NOT EXIST |
| JID002 | UID003 | SCHEDULE | 1,200KB | 2000/01/23 09:50 | 2000/01/23 09:55 | DOES NOT EXIST |
| JID003 | UID004 | REPORT | 2,300KB | 2000/01/24 11:10 | 2000/01/24 11:15 | EXISTS |
| ... | ... | ... | ... | ... | ... | ... |

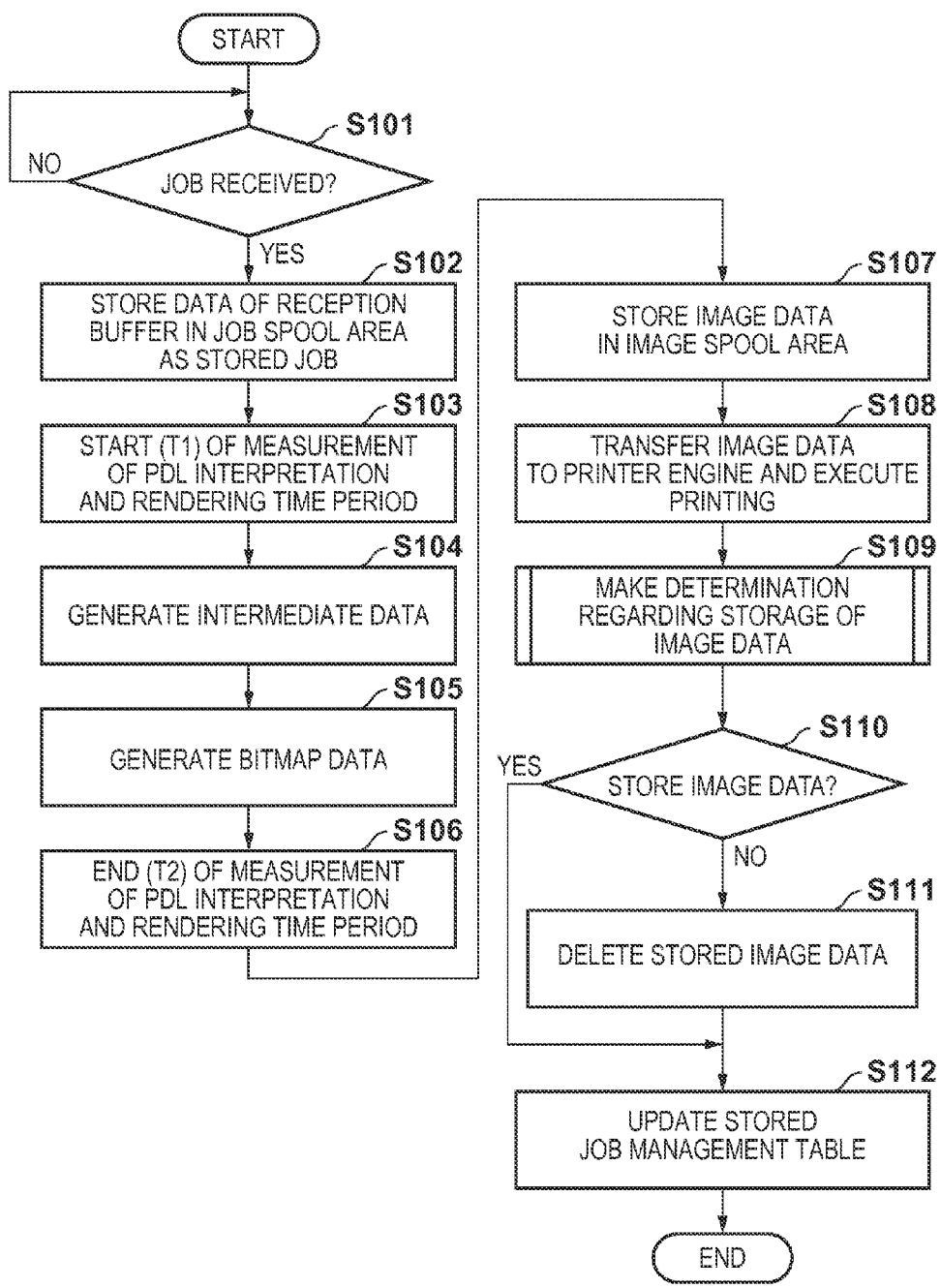

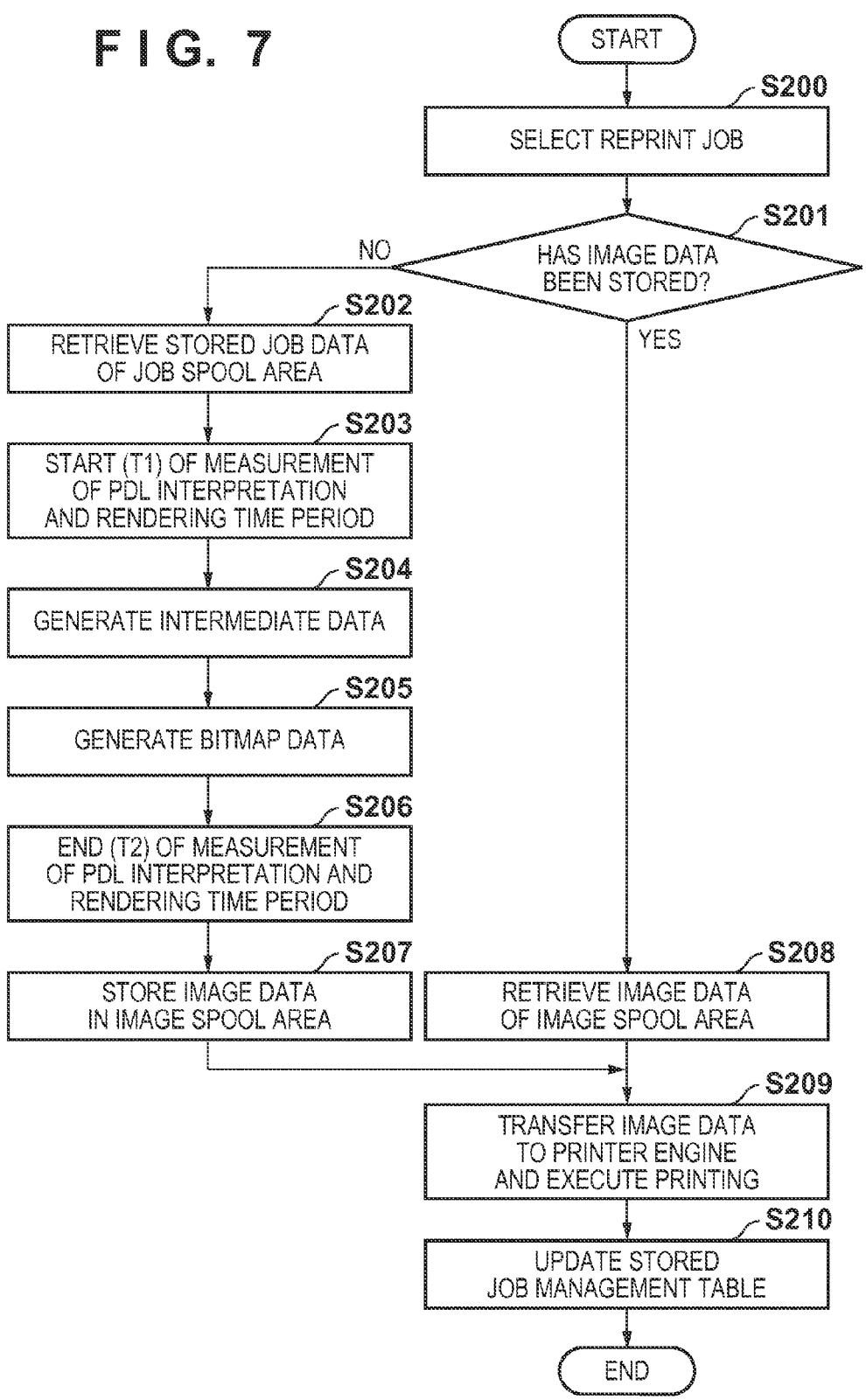

PRINTING APPARATUS FOR EXECUTING PRINT PROCESSING BASED UPON PRINT DATA

BACKGROUND OF THE INVENTION

1. Field of the Invention

The present invention relates to a printing apparatus which, in accordance with a reprint instruction, is capable of reprinting print data that has been printed once, and to a method of controlling this apparatus.

2. Description of the Related Art

There is user demand for the ability to print a certain document again after this document has already been printed. Japanese Patent Laid-Open No. 2001-063158 discloses a reprint technique for meeting this demand by reprinting a document in accordance with a reprint instruction, which is entered by performing an operation at the panel of an image forming apparatus, without re-transmitting the print data from a data processing apparatus to the image forming apparatus.

In ordinary print processing, an image forming apparatus stores a print job, which has been received from a data processing apparatus, in a storage device of the image forming apparatus, and deletes the stored print job after the job has undergone print processing.

In a reprint mode in which reprinting is possible, on the other hand, the image forming apparatus does not delete the stored print job, even after print processing has ended, and continues to store the print job to be reprinted until there is no longer space available in the storage device of the image forming apparatus. This means that an image once printed can be printed again in response to a reprint instruction performed by panel operation without print data being received from the data processing apparatus again.

In another proposal, the image forming apparatus in the reprint mode stores received print jobs automatically in a job spool area within the storage device. The image forming apparatus stores image data, which is the result of rendering an automatically stored print job, in the image spool area of the storage device. The image forming apparatus uses this stored image data when reprinting is performed, thereby shortening the time from start to end of printing. Japanese Patent Laid-Open No. 2009-122928 describes the storage not only of PDL data of a print job but also of a predetermined number of pages as image data obtained by rendering PDL data, and the execution of printing by using this image data when reprinting is performed.

The techniques mentioned above have the following problems: First, the storage area for print data capable of being stored in the storage device is limited. When a print job having a large number of pages overall is stored, the storage capacity of the storage device comes under pressure.

Second, even a print job that does not require very much time for rendering of PDL data to image data is stored in the storage device as image data. As a consequence, regardless of the fact that the image data is stored using the precious memory area of the storage device, a significant increase in speed at reprint time cannot be expected.

SUMMARY OF THE INVENTION

An aspect of the present invention is to eliminate the above-mentioned problems which are found in the conventional technology.

A feature of the present invention is to provide a technique for reducing the amount of image data stored while maintaining an increase in speed at the time the image data is reprinted.

According to an aspect of the present invention, there is provided a printing apparatus for executing print processing based upon print data, comprises: a save control unit configured to save the print data in a first memory area; a rendering unit configured to render the print data, which has been saved in the first memory area, into image data; a storage control unit configured to store the image data, which has been rendered by the rendering unit, in a second memory area; a print unit configured to print using the image data; and a determination unit configured to determine whether the image data, which has been stored in the second memory area, is to be saved for the purpose of reprint process, wherein the determination unit determines that the image data of the print data is to be saved if the number of pages of the print data is less than a predetermined value.

According to an aspect of the present invention, there is provided a method of controlling a printing apparatus for executing print processing based upon print data, comprises: a saving step of saving the print data in a first memory area; a rendering step of rendering the print data, which has been saved in the first memory area, into image data; a storage step of storing the image data, which has been rendered in the rendering step, in a second memory area; a printing step of printing using the image data; and a determination step of determining whether the image data, which has been stored in the second memory area, is to be saved for the purpose of reprint process, wherein the determination step determines that the image data of the print data is to be saved if the number of pages of the print data is less than a predetermined value.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram illustrating the configuration of a printing system that includes an image forming apparatus (printing apparatus) according to an embodiment of the present invention;

FIG. 4 is a diagram illustrating an example of a stored job management table managed by a stored job control unit according to the embodiment;

FIG. 6 is a flowchart for describing processing up to receipt and printing of a print job by a printer according to the embodiment;

FIG. 7 is a flowchart for describing processing carried out at execution of reprinting by a printer according to the embodiment.

DESCRIPTION OF THE EMBODIMENTS

Figure 2:
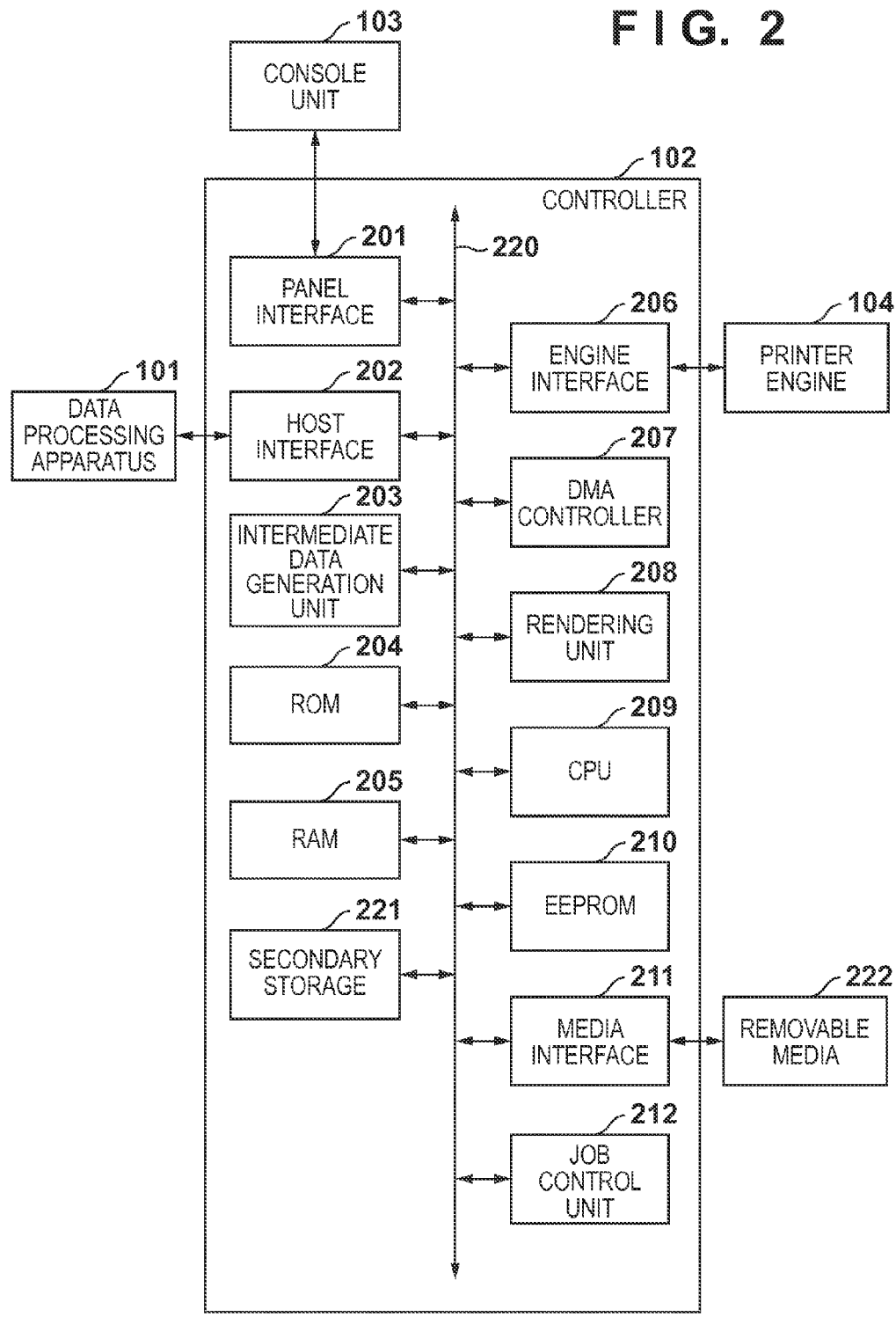
FIG. 2 is a block diagram for describing the configuration of a controller of a printer according to the embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

FIG. 1 is a block diagram illustrating the configuration of a printing system that includes an image forming apparatus (printing apparatus) 100 according to an embodiment of the present invention.

The image forming apparatus 100 has a controller 102, a console unit 103 and a printer engine 104. A data processing apparatus (personal computer) 101, which functions as a host computer that transmits a print job to the image forming apparatus 100, transmits print data, as well as attribute information of the print job, to the image forming apparatus 100 as the print job.

In this embodiment, a laser printer ("printer" below) is used as the image forming apparatus 100. It goes without saying that the image forming apparatus 100 according to this embodiment is not limited to a laser printer but may also be a printer which uses another printing method, such as an inkjet printer. Based upon print data (page description language (PDL), for example) supplied from the data processing apparatus 101, the controller 102 generates raster data (image data) page by page and sends the image data to the printer engine 104. The printer engine 104 forms an electrostatic latent image on a photosensitive drum based upon the raster data supplied from the controller 102, and transfers this latent image to and fixes it on a printing medium to thereby print the image by the electrophotographic method. The console unit 103 is used as a user interface. The controller 102 accepts a desired operation instruction from the user via the console unit 103. The controller 102 further displays the processing content of the image forming apparatus 100, as well as warnings intended for the user.

FIG. 2 is a block diagram for describing the configuration of the controller 102 of printer 100 according to the embodiment.

As shown in FIG. 2, a panel interface 201 controls an exchange of data between the console unit 103 and the controller 102. A CPU 209 accepts, via the console unit 103, settings and instruction content from the user using the console unit 103. A host interface 202 communicates bi-directionally with the data processing apparatus 101, such as a host computer, via a network. An intermediate data generation unit 203 converts a print job, which has been received from the data processing apparatus 101 via the host interface 202, to intermediate data having a form easily handled by the printer 100. A ROM 204 stores control program code and the like for allowing the printer 100 to execute the processing according to this embodiment as well as other processing. A RAM 205 provides a work area for the CPU 209 and is used as a main memory of the CPU 209. Data stored in the RAM 205 by the CPU 209 includes print data received via the host interface 202 and intermediate data generated by interpreting the print data. Also included in the stored data are bitmap data ("image data" below) produced by rendering this intermediate data, and various items of temporary processing status necessary for other processing.

Secondary storage 221 stores print data received via the host interface 202, image data obtained by rendering this print data, log information and the like. A hard-disk drive or SD card or the like is used as the secondary storage 221. An engine interface unit 206 controls interfacing between the printer engine 104 and the controller 102. The CPU 209 recognizes the state of the printer engine 104 and controls the printer engine 104 via the engine interface 206. A DMA controller 207 transfers image data, which has been stored in the RAM 205, to the engine interface 206 by DMA. A rendering unit 208 renders intermediate data, which has been stored in the RAM 205, into image data. Based upon the control program stored in the ROM 204, the CPU 209 controls devices connected to a CPU bus 220. An EEPROM 210 is a non-volatile memory for storing the settings information of the printer 100. A media interface 211 reads and writes various data such as image data, program data and device settings data from and to removable media 222 such as a USB memory.

A job control unit 212 is a module of a program stored in the ROM 204. This program is stored in the ROM 204 of the controller 102 and is executed by the CPU 209. The CPU 209 executes print processing upon storage of data, which has been received from the data processing apparatus 101, as a print job in the RAM 205 or secondary storage 221 by the job control unit 212. Furthermore, the CPU 209 stores the data, which has been received from the data processing apparatus 101, as a print job in the RAM 205 or secondary storage 221, and deletes a print job, which has been stored in the secondary storage 221, from the secondary storage. The CPU bus 220 includes address, data and control buses. Each of the above-mentioned devices indicated by 201 to 212 and 221 can access all devices connected to the CPU bus 220. The job control unit 212 is in charge of processing such as storage of print jobs and image data in the RAM 205 or secondary storage 221 for reprinting and deletion of these stored print jobs and image data. It should be noted that, in this embodiment, the job control unit 212 is described as a program module executed by the CPU 209, although it may be arranged so that the job control unit 212 is implemented by hardware such as, for example, an ASIC.

Figure 3:
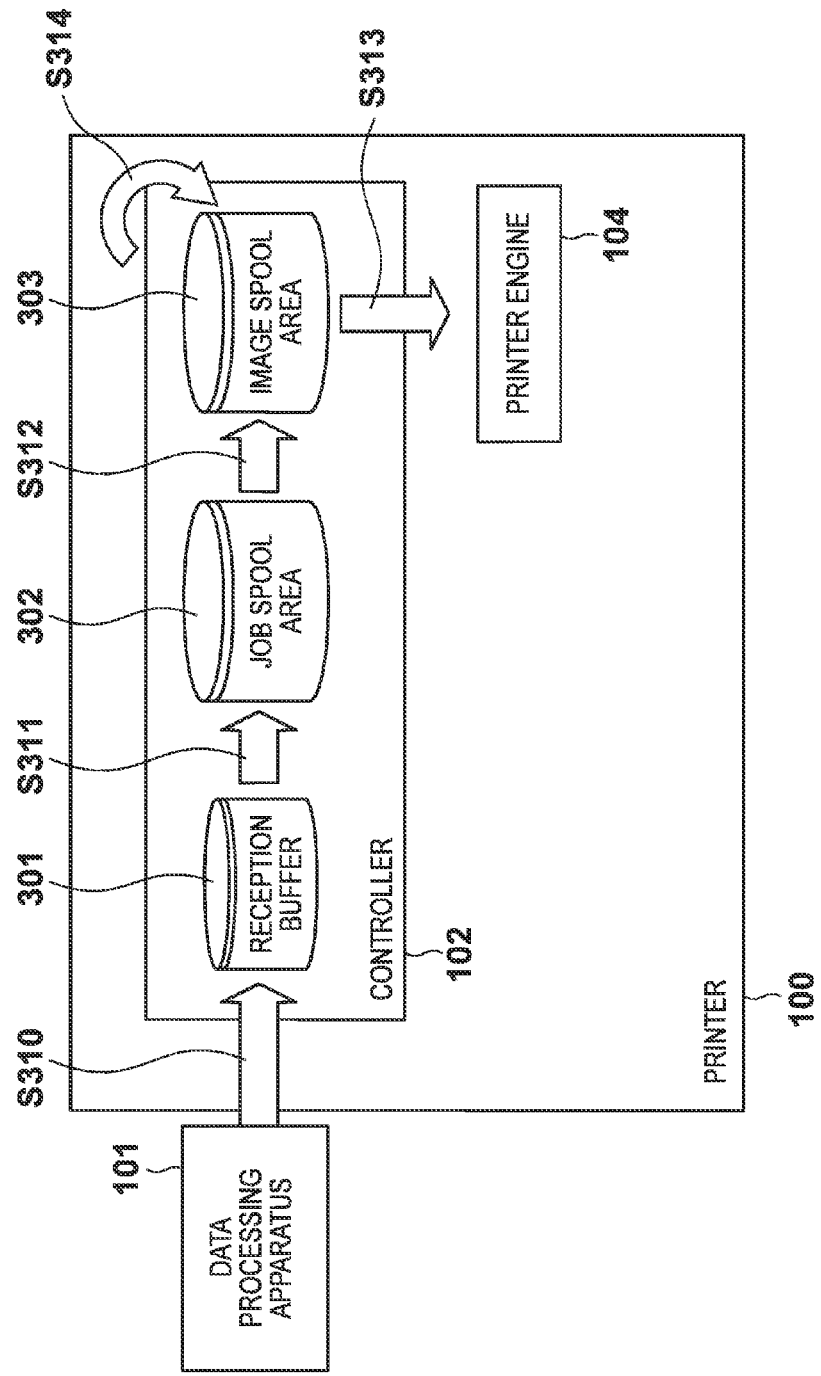
FIG. 3 is a diagram useful in describing the flow of data in the controller according to the embodiment.

FIG. 3 is a diagram useful in describing the flow of data in the controller 102 of printer 100 according to the embodiment.

As shown in FIG. 3, a reception buffer 301, which is provided in the RAM 205, stores print data received from the data processing apparatus 101. A job spool area 302, which is provided in the RAM 205 or secondary storage 221, stores print data that has been stored in the reception buffer 301. The capacity of the reception buffer 301 usually is smaller than that of the job spool area 302. An image spool area 303, which is provided in the RAM 205, stores image data that has been rendered by the rendering unit 208.

If the reception buffer 301 has space available, the host interface 202 receives print data from the data processing apparatus 101 and stores this data in the reception buffer 301 (S310). Upon receiving notification of the fact that print data has been stored in the reception buffer 301, the job control unit 212 checks to determine whether the job spool area 302 has free space of a size at least equal to the capacity of the reception buffer 301. If there is no vacancy, the job control unit 212 waits until space becomes available. If there is a vacancy, then the job control unit 212 stores the print data, which has been stored in the reception buffer 301, in the job spool area 302 as a print job, and erases the print data of the reception buffer 301 to thereby empty the reception buffer 301 (S311). On the other hand, the job control unit 212 also asynchronously executes processing for erasing a saved job that has been stored in the job spool area 302.

Under the condition that the image spool area 303 has free space of a predetermined size, the intermediate data generation unit 203 reads out the print job that has been stored in the job spool area 302 and executes PDL interpretation processing (intermediate data generation processing). Intermediate data generated by the intermediate data generation unit 203 is stored in a buffer (not shown) provided in the RAM 205. The rendering unit 208 starts rendering processing in accordance with the intermediate data that has been stored in this buffer and stores image data, which has been generated by this rendering processing, in the image spool area 303 (S312). While establishing synchronization with the printer engine 104, the engine interface 206 transfers the image data of the image spool area 303 to the printer engine 104 via the DMA controller 207 (S313). Further, after the transfer operation in S313, the job control unit 212 determines whether to save or erase the image data that has been stored in the image spool area 303 (S314) and then either saves or erases the image data.

The controller 102 according to this embodiment is equipped with a reprint mode in addition to the ordinary print mode for receiving and printing print data from the data processing apparatus 101. The reprint mode and the ordinary print mode can be switched between by, for example, a setting made by the user who is using the console unit 103.

In the reprint mode, a print job that has been printed one time is kept stored in the job spool area 302 and is reprinted, in accordance with a print instruction from the user, at a separate timing. Further, in order to shorten printing time when the print job is reprinted, the print job is not stored in the job spool area 302. Instead, image data obtained by rendering this print job is stored in the image spool area 303 beforehand and the stored image data is utilized at the time of reprinting. When the reprint mode has been set, the controller 102 exercises control in such a manner that, even if a print job has ended, the print job (saved job data), which has automatically been saved in the job spool area 302, is left intact by the job control unit 212 and not erased. When the reprint mode has been set, the job control unit 212 manages the stored job in accordance with a stored job management table, which will be described later with reference to FIG. 4.

The controller 102 displays print jobs, which have been stored in the job spool area 302, as a reprintable job list on the console unit 103 via the panel interface 201. An example of displays in which a reprintable job list is displayed on the console unit 103 will be described later with reference to FIGS. 5A to 5D.

If the user issues a reprint instruction via the console unit 103 with regard to a reprintable job list displayed on the console unit 103, the controller 102 executes printing in accordance with the stored job specified by the instruction. If image data regarding the stored job of interest has been stored, then printing is performed using this stored image data.

FIG. 4 is a diagram illustrating an example of a stored job management table managed by the job control unit 212 according to the embodiment.

The stored job management table is a management table for allowing the job control unit 212 to manage all print jobs that have been stored in the job spool area 302 and image data that has been stored in the image spool area 303. The stored job management table has been stored in a management area of the job spool area 302. More specifically, the table has been stored in the RAM 205 or secondary storage 221.

When print data that has been stored in the reception buffer 301 is to be transferred to the job spool area 302, the job control unit 212 determines whether this print data is print data of a new job. If this print data is determined to be print data of a new job, then the job control unit 212 interprets the job information (attribute information) of this print data and extracts information, namely the job ID, job owner (the ID of the user who issued this job), job name, job size and job generation date and time. This extracted information is registered anew in the stored job management table. In accordance with notification of end of the print job from the engine interface 206, the job control unit 212 registers or updates the latest print date and time of the job of interest. Furthermore, upon receiving a reprint instruction from the user via the console unit 103, the job control unit 212 executes reprint and, in a case where notification of end of printing has been received from the engine interface 206, updates the latest print date and time. Further, the job control unit 212 determines whether to continue storing or to erase the image data that has been stored in the image spool area 303. If erasure is determined, the job control unit 212 deletes the stored image data. In the example of FIG. 4, it will be understood that image data whose job ID is "JID003" has been stored but not image data of print jobs whose job IDs are "JID001" and "JID002".

FIGS. 5A to 5D depict views illustrating examples of UI (User Interface) screens, which are for accepting a reprint instruction, displayed on the console unit 103 in this embodiment.

Figure 5A:
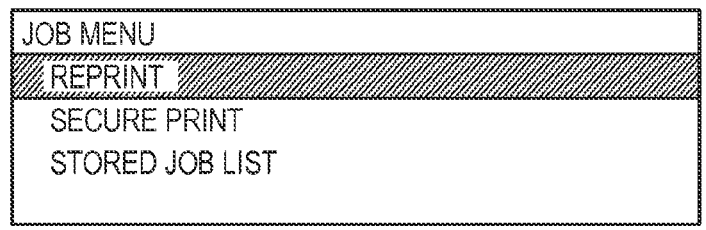
FIGS. 5A to 5D depict views illustrating examples of UI (User Interface) screens, which are for accepting a reprint instruction, displayed on a console unit in the embodiment.

FIG. 5A depicts a view illustrating an example of a submenu screen for manipulating jobs that have been stored in the job spool area 302. If the user selects "REPRINT" on this submenu screen via the console unit 103, the panel interface 201 displays a screen, which is shown in FIG. 5B, in accordance with the job owner information in the stored job management table via the job control unit 212.

Figure 5B:
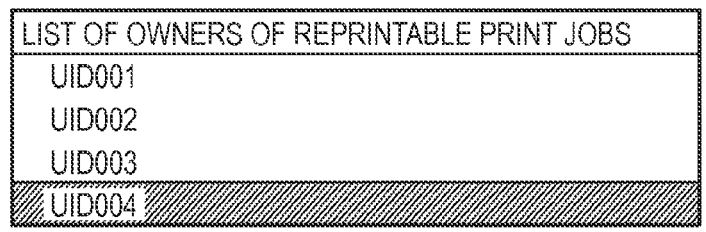

FIG. 5B depicts a view illustrating an example of a display of a list of owners of reprintable print jobs. By utilizing this screen, the user designates the owner information of a job the reprinting of which is to be instructed. For example, if the user selects and designates "UID004" on this screen via the console unit 103, then the panel interface 201 displays a screen, which is shown in FIG. 5C, in accordance with job names corresponding to the job owner "UID004".

Figure 5C:
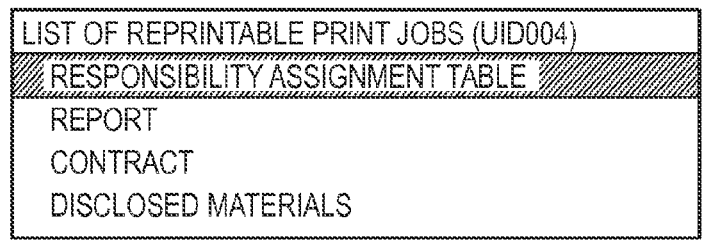

FIG. 5C depicts a view illustrating an example of a display of a list of reprintable print jobs having the job owner "UID004". By utilizing this screen, job information of a job to be reprinted is designated. For example, if the user selects "RESPONSIBILITY ASSIGNMENT TABLE" on this screen via the console unit 103, then the panel interface 201 acquires a job ID (JID001), which corresponds to the job name "RESPONSIBILITY ASSIGNMENT TABLE", via the job control unit 212. A screen for instructing the start of reprinting shown in FIG. 5D is displayed.

Figure 5D:
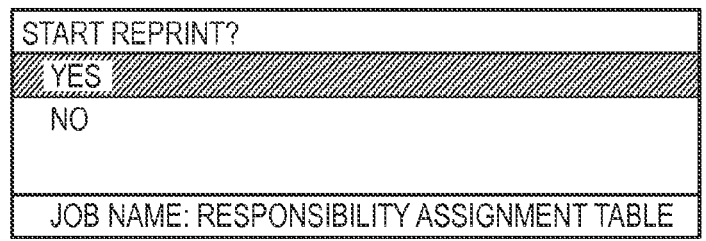

FIG. 5D depicts a view illustrating an example of a screen for confirming the start of reprinting. For example, if the user selects "YES" on this screen via the console unit 103, then the panel interface 201 instructs the start of reprinting of the print job "RESPONSIBILITY ASSIGNMENT TABLE" having the job ID "JID004". The job control unit 212 generates the reprint job in accordance with the reprint start instruction, which is for the print job of job ID "JID004", from the panel interface 201. Since the image data of the print job of job ID "JID004" has been stored in the image spool area 303, now the job control unit 212 generates the reprint job based upon this stored image data.

FIG. 6 is a flowchart for describing processing up to receipt and printing of a print job by the printer 100 according to this embodiment. It should be noted that the processing indicated by the flowchart of FIG. 6 is achieved by having the CPU 209 execute the program that has been stored in the ROM 204.

First, in step S101, the CPU 209 waits for notification of receipt of print data from the data processing apparatus 101 via the host interface 202. Notification of receipt of print data is achieved as a result of the host interface 202 receiving the print data from the data processing apparatus 101 and storing this print data in the reception buffer 301 in 5301 in FIG. 3. When notification of receipt of print data arrives from the host interface 202, the CPU 209 determines whether space of a predetermined size is available in the job spool area 302. For example, this space of a predetermined size can be a space having a memory size identical with that of the reception buffer 301. When such space of the predetermined size is not available, the CPU 209 determines whether a value, which is obtained by subtracting the total value of the job sizes of the stored jobs registered in the stored job management table from the overall memory size of the job spool area 302, is smaller than the memory size of the reception buffer 301. If this value is determined to be smaller, then the CPU 209 creates space in the job spool area 302 by erasing any stored job. A criterion that can be used to determine the stored job to be erased at this time is, for example, the age of the print job, with the print job having the oldest "latest print date and time" in the stored job management table being the one that is erased.

When the CPU 209 thus is capable of assuring the necessary memory size in the job spool area 302, control proceeds to step S102. Here the CPU 209 stores the print data of the reception buffer 301 in the job spool area 302 as a stored job, registers the new job in the stored job management table and advances control to step S103.

Next, in order to measure the period of time it takes for generating image data from the stored job stored in the job spool area 302, in step S103 the job spool area 302 records a time T1 at which the image data starts being generated. Then, in step S104, by using the intermediate data generation unit 203, the CPU 209 reads out the stored job stored in the job spool area 302 and executes PDL interpretation processing to thereby generate intermediate data. The CPU 209 then stores this intermediate data in a buffer (not shown) provided in RAM 205. Next, in step S105, the CPU 209 uses the rendering unit 208 to execute rendering processing in accordance with the intermediate data that has been stored in the buffer (not shown), thereby generating image data.

Next, in step S106, upon receiving notification of completion of rendering processing from the rendering unit 208, the CPU 209 records a time T2 at which generation of the image data ended. The CPU 209 further determines whether the image spool area 303 has space of a predetermined size available. For example, the space of the predetermined size can have a size identical with that of the image data generated in step S105. If this space of the predetermined size does not exist, the CPU 209 finds a value obtained by subtracting, from the overall size of the image spool area 303, the total value of the sizes of items of image data for which the stored image information that has been registered in the stored job management table is "EXISTS". If this value is smaller than the size of the image data generated in step S105, then the CPU 209 creates space in the image spool area 303 by erasing any stored item of image data. A criterion that can be used to determine the stored image data to be erased at this time is, for example, the age of the print job, with the image data of the print job having the oldest "latest print date and time" in the stored job management table being the one that is erased. A further criterion is to erase the image data of a print job for which a fixed period of time has elapsed from the latest print data and time, or to divide the total of image data to be stored into a stipulated number of pages.

When the CPU 209 thus assures the space of the necessary size in the image spool area 303, control proceeds to step S107. Here the CPU 209 stores the image data generated in step S105 in the image spool area 303 and advances control to step S108. In step S108, the CPU 209 transfers the image data stored in the image spool area 303 to the printer engine 104 and executes printing.

After the printing of the applicable page is completed, in step S109 the CPU 209 determines whether to continue storage of or to delete the image data being stored in the image spool area 303. This processing will be described later with reference to the flowchart of FIG. 8. The determination as to whether to continue storage of this image data is carried out based, for example, upon the difference (T2–T1) between the measured times recorded in steps S103 and S106. For instance, it may be arranged so that the image data of the applicable page is stored in a case where this time difference is greater than a period of time necessary in order to satisfy throughput calculated from performance of the printer engine 104 or performance of the controller 102. Such measures of performance as values of throughput corresponding to single-sided and double-sided conveyance speed and permissible interval between sheets in the cool-down process for every printer engine 104 can be mentioned as examples of performance of the printer engine 104.

Further, in a print job that includes a plurality of pages, the image data of all pages of the applicable print job may be left stored in the image spool area 303 in a case where even one page whose image data is determined to be stored is included. As another example of a criterion, it may be arranged so that if the total number of pages of a print job is less than a stipulated number of pages, the image data of these pages is stored. In this case it may be arranged so that the stipulated number of pages is capable of being set by the user.

Next, control proceeds to step S110. Here, based upon the criterion decided in step S109, the CPU 209 determines whether or not to store the image data of the applicable page of the applicable print job. Control proceeds to step S112 if it is determined to store the image data. If it is determined not to store the image data, then control proceeds to step S111. Here the CPU 209 deletes the applicable image data in the image spool area 303 and advances control to step S112, where the CPU 209 updates the information in the stored job management table in accordance with the determinations made in steps S109 to S111.

In accordance with the processing described above, the image spool area can be used efficiently and the time needed for reprinting shortened by storing only image data that satisfies a predetermined condition in the image spool area as image data for reprint.

Further, since data for which the period of time it takes to render the PDL data falls within a predetermined period of time is stored intact as PDL data in the job spool area for reprinting purposes, the degree to which the memory capacity of the job spool area is put under pressure is alleviated so that the print data for reprint can be stored. Further, an increase in length of time needed for reprint can be suppressed while suppressing an increase in amount of data stored for reprint. In general, reprinting can be performed at high speed in a case where the data is stored in the form of image data. However, since image data generally involves a greater amount of data than does PDL data, a determination is made as to whether to store just the PDL data in order to conserve memory capacity, or to store even the image data.

FIG. 7 is a flowchart for describing processing carried out at execution of reprinting by the printer 100 according to this embodiment. It should be noted that the processing indicated by the flowchart of FIG. 7 is achieved by having the CPU 209 execute the program that has been stored in the ROM 204.

First, in step S200, the user selects a print job to be reprinted and instructs the start of reprinting through use of the reprint instruction screens shown in FIGS. 5A to 5D. As a result, the print job to be reprinted is uniquely decided from among jobs that have been stored in the stored job management table shown in FIG. 4, and control proceeds to step S201. Here, based upon the information under "STORED IMAGE" in the stored job management table, the CPU 209 determines whether the image data of the applicable print job has been stored in the image spool area 303. Control proceeds to step S202 if the image data has not been stored and to step S208 if the image data has been stored. In step S208, the CPU 209 retrieves the applicable image data that has been stored in the image spool area 303 and advances control to step S209. Here, in a manner similar to that in step S108 of FIG. 6, the stored image data is transferred to the printer engine 104 and is printed thereby. Next, in step S210, in a manner similar to that in steps S109 to S112 of FIG. 6, the CPU 209 executes processing for storing or for deleting the image data and updates the latest print date and time in the stored job management table.

If the image data has not been stored, on the other hand, then control proceeds to step S202. Here the CPU 209 retrieves the image data that has been stored in the job spool area 302 and advances control to step S203. Here, in a manner similar to that in step S103 of FIG. 6, the CPU 209 registers the time T1 at which generation of the image data starts. Next, in step S204, in a manner similar to that in step S104 of FIG. 6, the CPU 209 uses the intermediate data generation unit 203 to read out the stored job stored in the job spool area 302 and to execute PDL interpretation processing, thereby generating intermediate data. Next, control proceeds to step S205. Here, in a manner similar to that in step S105 of FIG. 6, the CPU 209 uses the rendering unit 208 to execute rendering processing in accordance with the intermediate data generated in step S204, thereby generating image data. Next, in step S206, in a manner similar to that in step S106 in FIG. 6, the CPU 209 records the time T2 at which generation of the image data ended. Next, in step S207, in a manner similar to that in step S107, the CPU 209 stores the image data generated in step S205 in the image spool area 303 and advances control to step S209. Here, in a manner similar to that in step S108 in FIG. 6, the CPU 209 transfers the image data stored in the image spool area 303 to the printer engine 104 and executes printing. Then, in step S210, in a manner similar to that in steps S109 to S112 in FIG. 6, the CPU 209 executes processing for storing or deleting image data and updates the latest print date and time in the stored job management table.

In accordance with this embodiment, as described above, rendered image data of a print job the overall number of pages of which is small, or rendered print data of a print job that requires a long period of time to be rendered into image data, can be stored efficiently. As a result, an effect of this embodiment is that reprinting can be performed at high speed while expenditure of memory is suppressed.

Figure 8:
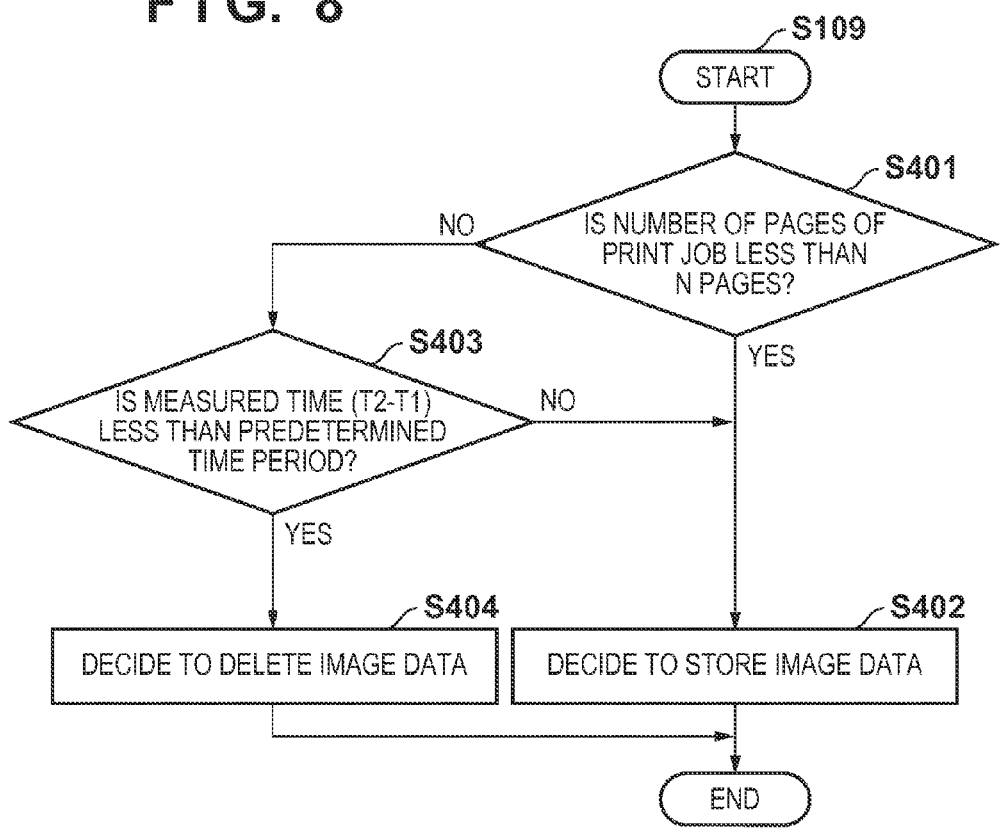
FIG. 8 is a flowchart for describing processing for deciding whether to save image data in step S109 in FIG. 6.

FIG. 8 is a flowchart for describing processing for deciding whether to save image data in step S109 in FIG. 6.

First, in step S401, the CPU 209 determines whether the overall number of pages of this print job is less than N (where N is a positive integer, e.g., N=10). If the overall number of pages is less than N, control proceeds to step S402. Here the CPU 209 determines that the amount of image data is small, decides to store this image data in the image spool area 303 and returns control to the original processing.

On the other hand, if it is found in step S401 that the overall number of pages of this print job is equal to or greater than N, then control proceeds to step S403. Here the CPU 209 determines whether the time difference (rendering time: T2−T1) measured in steps S103, S106 in FIG. 6 or in steps S203, S206 in FIG. 7 is shorter than a predetermined period of time. If it is decided in step S403 that the time difference is shorter than the predetermined period of time, control proceeds to step S404. Here the CPU 209 determines that the time needed for reprint is not that long, even if storage is in the form of PDL data as is, and decides to delete the applicable image data in the image spool area 303. Control then returns to the original processing. Further, if it is determined in step S403 that the rendering time period is longer than the predetermined period of time, then control proceeds to step S402. Here the CPU 209 determines that rendering of the image data of the print job takes a long period of time, decides to store this image data in the image spool area 303 and returns control to the original processing.

It should be noted that an arrangement may be adopted in which, if it is determined in step S401 of FIG. 8 that the overall number of pages of this print job is equal to or greater than N, control proceeds to step S404 and the CPU 209 decides to delete the applicable image data in the image spool area 303.

Thus, in accordance with this embodiment, print data that does not require much time for rendering into image data is stored as PDL data, the amount of which is small. Further, if the amount of image data resulting from rendering of a print job is less than a predetermined amount, then the print data is stored in the image spool area 303 as image data. As a result, an increase in amount of image data in the image spool area 303 can be suppressed while high-speed reprint is achieved.

In accordance with this embodiment, image data of a job the overall number of pages of which is small is stored in an image spool area. As a result, the number of jobs for which image data is stored for reprint can be increased without the image spool area being occupied by image data of a job the overall number of pages of which is large. Further, the image data of a print job that takes time for rendering into the image data is stored in the image spool area preferentially, thereby enabling storage of much image data that is effective in curtailing reprint time.

In the foregoing embodiment, it is described that a print job for reprint and image data are stored in the job spool area and image spool area, respectively, of the RAM 205. However, it may be arranged so that the print job for reprint and the image data are, for example, moved from the RAM 205 and stored in the secondary storage 221. This would make it possible to reduce the occurrence of a situation in which the job spool area and image spool area of the RAM 205 become filled with data for reprint, as a result of which it would no longer be possible to render the data of successive jobs.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-262656, filed Nov. 30, 2011, which is hereby incorporated by reference herein in its entirety.

What is claimed is:

1. A printing apparatus for executing print processing based upon print data, comprising:
a save control unit configured to receive a job and save print data of the job in a first memory area;
a rendering unit configured to render the print data, which has been saved in the first memory area, into image data;
a storage control unit configured to store the image data, which has been rendered by the rendering unit, in a second memory area;
a storing unit configured to store the print data and the image data for the purpose of reprint process of the job;
a print unit configured to print using the image data;
a measurement unit configured to measure a rendering time period over which the rendering unit renders the print data into the image data; and
a control unit configured to:
(i) if the rendering time period measured by the measurement unit is longer than a predetermined time period, make the image data remain in the storing unit for the purpose of the reprint process, and
(ii) if the rendering time period measured by the measurement unit is not longer than the predetermined time period, delete the image data in the storing unit.

2. The apparatus according to claim 1, further comprising:
an instruction unit configured to instruct execution of the reprint process of the job; and
a reprint unit configured to, in response to a reprint instruction from the instruction unit, cause the print unit to print based upon image data in a case that the image data of the job is stored in the storing unit, and in a case that the image data of the job is not stored in the storing unit, cause the rendering unit to render the print data of the job that is stored in the storing unit into image data and execute the reprint process of the job based upon the rendered image data.

3. The apparatus according to claim 1, wherein if the second memory area does not have a vacant area capable of storing the image data, the storage control unit deletes image data of print data, which has the oldest print date and time, among image data that has been stored in the second memory area, and thereafter stores the image data, which has been rendered by the rendering unit, in the second memory area.

4. A method of controlling a printing apparatus for executing print processing based upon print data, comprising:
receiving a job and saving print data of the job in a first memory area;
rendering the print data, which has been saved in the first memory area, into image data;
storing the image data, which has been rendered in the rendering step, in a second memory area;
storing the print data and the image data for the purpose of reprint process of the job in a storing unit;
printing using the image data;
measuring a rendering time period over which the rendering step renders the print data into the image data;
controlling to make the image data, which has been stored in the second memory area, remain in the storing unit for the purpose of the reprint process if the rendering time period measured in the measuring step is longer than a predetermined time period; and
controlling to delete the image data in the storing unit if the rendering time period measured in the measuring step is not longer than the predetermined time period.

5. The method according to claim 4, further comprising:
instructing execution of the reprint process of the job; and
in response to a reprint instruction, executing the reprint process based upon image data when the image data of the job is stored in the storing unit, and in a case that it is determined that the image data of the job is not stored in the storing unit, rendering the print data of the job that is stored in the storing unit into image data, and executing reprint process of the job based upon the rendered image data.

* * * * *